US011201977B2

United States Patent
Nakamura (10) Patent No.: US 11,201,977 B2
(45) Date of Patent: Dec. 14, 2021

(54) DAMPER UNIT FOR ROTATABLE SHEET STACKER IN IMAGE READING APPARATUS, IMAGE FEEDING APPARATUS AND IMAGE FORMING APPARATUS

(71) Applicant: CANON KABUSHIKI KAISHA, Tokyo (JP)

(72) Inventor: Takatsugu Nakamura, Kawaguchi (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/944,613

(22) Filed: Jul. 31, 2020

(65) Prior Publication Data
US 2021/0037155 A1    Feb. 4, 2021

(30) Foreign Application Priority Data
Aug. 1, 2019   (JP) .............................. JP2019-141901

(51) Int. Cl.
*H04N 1/04*    (2006.01)
*H04N 1/00*    (2006.01)

(52) U.S. Cl.
CPC ..... *H04N 1/00652* (2013.01); *H04N 1/00631* (2013.01)

(58) Field of Classification Search
None
See application file for complete search history.

(56) References Cited

U.S. PATENT DOCUMENTS

| 5,532,826 | A  | * | 7/1996 | Miyao | G03G 15/60 |
| | | | | | 358/296 |
| 8,934,802 | B2 | * | 1/2015 | Koyanagi | B41J 13/14 |
| | | | | | 399/81 |
| 9,116,500 | B2 | * | 8/2015 | Ito | G03G 21/1619 |
| 9,327,926 | B2 | * | 5/2016 | Chiba | B65H 1/04 |
| 2014/0210157 | A1 | * | 7/2014 | Aoyama | B65H 1/04 |
| | | | | | 271/147 |

FOREIGN PATENT DOCUMENTS

JP         2004359409 A    12/2004

* cited by examiner

*Primary Examiner* — Dung D Tran
(74) *Attorney, Agent, or Firm* — Venable LLP (57) ABSTRACT

An image reading apparatus includes an image reading portion; a main assembly; a rotatable member; a damper unit mounted to either one of the main assembly and the rotatable member and including a cylinder portion and a piston portion inserted into the cylinder portion, wherein the damper unit is expanded in an expansion direction and contracted in a contraction direction by sliding the cylinder portion and the piston portion relative to each other; and a contact portion provided on the other one of said main assembly and said rotatable member and configured to contact said damper unit, wherein the damper unit suppresses a speed of said rotatable member when said rotatable member lowers from an upper position toward a lower position in a state in which the contact portion contacts and presses the damper unit in the contraction direction.

10 Claims, 5 Drawing Sheets

DAMPER UNIT FOR ROTATABLE SHEET STACKER IN IMAGE READING APPARATUS, IMAGE FEEDING APPARATUS AND IMAGE FORMING APPARATUS

FIELD OF THE INVENTION AND RELATED ART

The present invention relates to an image reading apparatus for reading image information from a sheet, a sheet feeding apparatus for feeding the sheet, and an image forming apparatus for forming an image on a recording material (sheet).

In the image reading apparatus mounted in a copying machine or in the image reading apparatus used singly, in some cases, an original tray on which sheets which are originals are stacked is provided, and the sheets stacked on the original tray are fed one by one and thus a reading operation is carried out. In order to easily take out the sheet discharged below the original tray, the original tray is constituted so as to be rotatable above a tray position for permitting feeding of the sheet in some cases.

Incidentally, when a user raises the original tray and then releases his (her) hand(s) from the original tray, there is a possibility that the original tray falls vigorously and collides with a frame or the like of the image reading apparatus and thus a large sound (noise) generates or a member is broken. Japanese Laid-Open Patent Application (JP-A) 2004-359409 discloses that the falling of the original tray is decelerated by using a rotary damper.

However, in a constitution disclosed in JP-A 2004-359409, in order to cause the rotary damper to generate a sufficiently large torque, there was a need that a gear train is configured so that a rotational speed of the rotary damper is larger than angular velocity (speed) at which the original tray lowers. This constituted an obstacle to downsizing and cost reduction of the image reading apparatus.

SUMMARY OF THE INVENTION

A principal object of the present invention is to provide an image reading apparatus, an image feeding apparatus and an image forming apparatus which are capable of suppressing a lowering speed of a rotatable member.

According to an aspect of the present invention, there is provided an image reading apparatus comprising: a reading unit configured to read an image on a sheet; a main assembly; a rotatable member supported by the main assembly so as to be rotatable between a lower position and an upper position above the lower position; a damper unit mounted in either one of the main assembly and the rotatable member and including a cylinder portion and a piston portion inserted into the cylinder portion, wherein the damper unit is configured to be expanded in an expansion direction and to be contracted in a contraction direction by sliding the cylinder portion and the piston portion relative to each other; and a contact portion provided on the other one of the main assembly and the rotatable member and configured to contact the damper unit,
wherein the damper unit suppresses a speed of the rotatable member when the rotatable member lowers from the upper position toward the lower position in a state in which the contact portion contacts and presses the damper unit in the contraction direction.

According to another aspect of the present invention, there is provided a sheet feeding apparatus comprising: a feeding unit configured to feed a sheet; a main assembly; a stacking member on which the sheet fed by the feeding unit is stacked, the stacking member being supported by the main assembly so as to be rotatable between a lower position and an upper position above the lower position; a damper unit mounted in either one of the main assembly and the stacking member and including a cylinder portion and a piston portion inserted into the cylinder portion, wherein the damper unit is configured to be expanded in an expansion direction and to be contracted in a contraction direction by sliding the cylinder portion and the piston portion relative to each other; and a contact portion provided on the other one of the main assembly and the stacking member and configured to contact the damper unit, wherein the damper unit suppresses a speed of the rotatable member when the rotatable member lowers from the upper position toward the lower position in a state in which the contact portion contacts and presses the damper unit in the contraction direction.

According to a further aspect of the present invention, there is provided an image forming apparatus comprising: an image forming unit configured to form an image on a sheet; a main assembly; a rotatable member supported by the main assembly so as to be rotatable between a lower x position and an upper position above the lower position; a damper unit mounted in either one of the main assembly and the rotatable member and including a cylinder portion and a piston portion inserted into the cylinder portion, wherein the damper unit is configured to be expanded in an expansion direction and to be contracted in a contraction direction by sliding the cylinder portion and the piston portion relative to each other; and a contact portion provided on the other one of the main assembly and the stacking member and configured to contact the damper unit, wherein the damper unit suppresses a speed of the rotatable member when the rotatable member lowers from the upper position toward the lower position in a state in which the contact portion contacts and presses the damper unit in the contraction direction.

Further features of the present invention will become apparent from the following description of exemplary embodiments with reference to the attached drawings.

BRIEF DESCRIPTION OF THE DRAWINGS

Parts (a), (b) and (c) of FIG. 3 are schematic views showing a supporting structure of an original tray in the embodiment 1.

DESCRIPTION OF EMBODIMENTS

In the following, embodiments for carrying out the present invention will be described with reference to the drawings.

Embodiment 1

Figure 1:
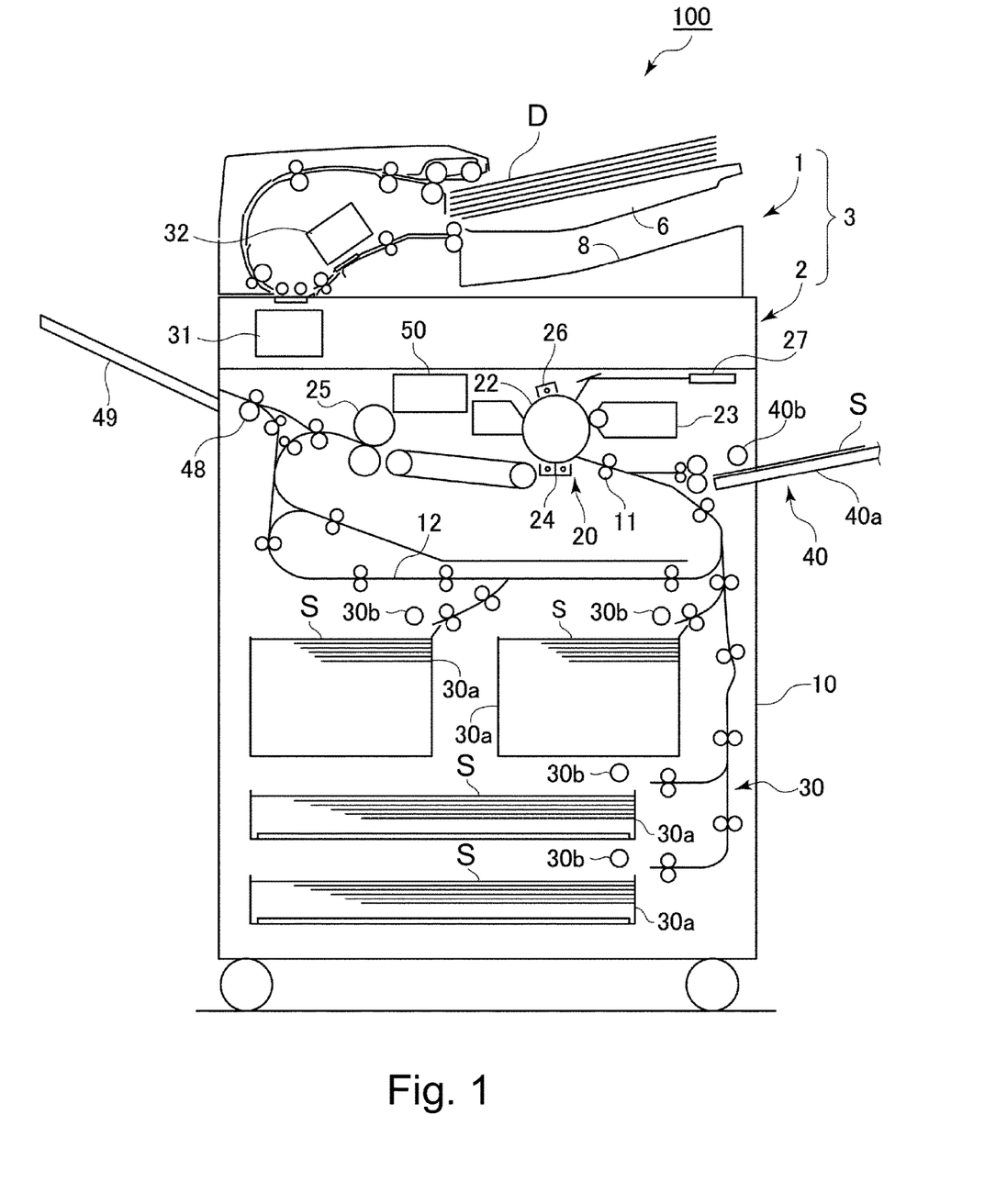
FIG. 1 is a schematic view of an image forming apparatus according to an embodiment 1.

An embodiment 1 of the present invention will be described. FIG. 1 is a schematic view showing an image forming apparatus 100 which is a laser beam printer of an electrophotographic type. The image forming apparatus 100 includes a scanner 3 as an image reading apparatus for reading image information from an original D, an image forming apparatus main assembly (hereinafter, referred to as a printer main assembly) 10 for forming an image on a recording material, and a controller 50 for controlling the scanner 3 and the printer main assembly 10. Incidentally, as the original or the recording material, it is possible to use various sheets, different in size and material, such as paper including plain paper, thick paper and the like, a plastic film, a cloth, a surface-treatment sheet material such as coated paper, and a special-shaped sheet material such as an envelope or index paper.

The printer main assembly 10 includes an image forming portion 20 for forming an image on a sheet S which is the recording material, a main assembly feeding portion 30 for feeding the sheet S to the image forming portion 20, a manual feeding portion 40, and a discharge tray 49 onto which the image-formed sheet S is discharged. The main assembly feeding portion 30 includes a plurality of cassettes 30a each capable of being inserted into and pulled out of the printer main assembly 10 and includes feeding units 30b for feeding sheets, one by one, accommodated in the associated cassette 30a. The sheet fed by the feeding unit 30b is fed toward a registration roller pair 11 through a feeding passage provided inside the printer main assembly 10. The manual feeding portion 40 includes a manual feeding tray 40a which is rotatably supported by the printer main assembly 10 and which is openable relative to a side surface of the printer main assembly 10, and includes a feeding unit 40b for feeding sheets, one by one, stacked on the manual feeding tray 40a put in an open state. The sheet S fed by the feeding unit 40b is also fed toward the registration roller pair 11 through a feeding passage provided inside the printer main assembly 10. The registration roller pair 11 corrects oblique movement of the sheet S and thereafter feeds the sheet S toward a transfer device 24 in synchronism with progress of a process for forming a toner image in the image forming portion 20.

The image forming portion 20 forms an image on the sheet S on the basis of image information read from the original D by the scanner 3 or image information inputted from an external information processing device. That is, in the image forming portion 20, a surface of a photosensitive drum 22 which is a photosensitive member is electrically charged uniformly by a charger 26. A laser scanner 27 scans the surface of the photosensitive drum 22 with laser light while exposing the drum surface to the laser light, so that an electrostatic latent image based on the image information is formed (written) on the drum surface. This electrostatic latent image is developed into a toner image with a developer supplied from a developing device 23. The toner image carried on the photosensitive drum 22 is transferred from the photosensitive drum 22 onto the sheet S by an electrostatic bias formed by the transfer device 24. At that time, feeding of the sheet S by the registration roller pair 11 is controlled so that timing when the toner image carried on the photosensitive drum 22 reaches the transfer device 24 and timing when the sheet S is sent to the transfer device 24 are synchronized with each other.

On a side downstream of the transfer device 24 with respect to a feeding direction of the sheet S, a fixing device 25 is provided. The fixing device 25 includes a rotatable member pair rotatable while nipping the sheet S and a heat source such as a halogen lamp for heating the toner image on the sheet S through the rotatable member pair, and heats and presses the toner image while feeding the sheet S. By this, the toner is melted and thereafter is fixed, so that the image formed on the sheet S is obtained.

The sheet S passed through the fixing device 25 is discharged from the printer main assembly 10 by a discharging roller pair 48 and is stacked onto a stacking tray 49. Incidentally, in the case where images are formed on double (both) sides (surfaces) of the sheet S, the image is formed on a first side (surface) of the sheet S, and thereafter, the sheet S is fed toward the registration roller pair 11 again through a reverse feeding passage 12. Thereafter, the image is formed on a second side (surface) of the sheet S by passing through the transfer device 24 and the fixing device 25, and then the sheet S is discharged onto the discharge tray 49 by the discharging roller pair 48.

The above-described image forming portion 20 which is an electrophotographic unit of a direct transfer type is an example of an image forming means for forming the image of the recording material. In the case where the above-described constitution (technique) is applied to the image forming apparatus, the image forming means may also be an electrophotographic unit of an intermediary transfer type in which the toner image formed on the photosensitive member is transferred onto the sheet through an intermediary transfer type. Further, the image forming means is not limited to the electrophotographic unit, but for example, a printing unit of an ink jet type or an offset printing mechanism may also be used as the image forming means.

General Structure of Scanner

Figure 2:
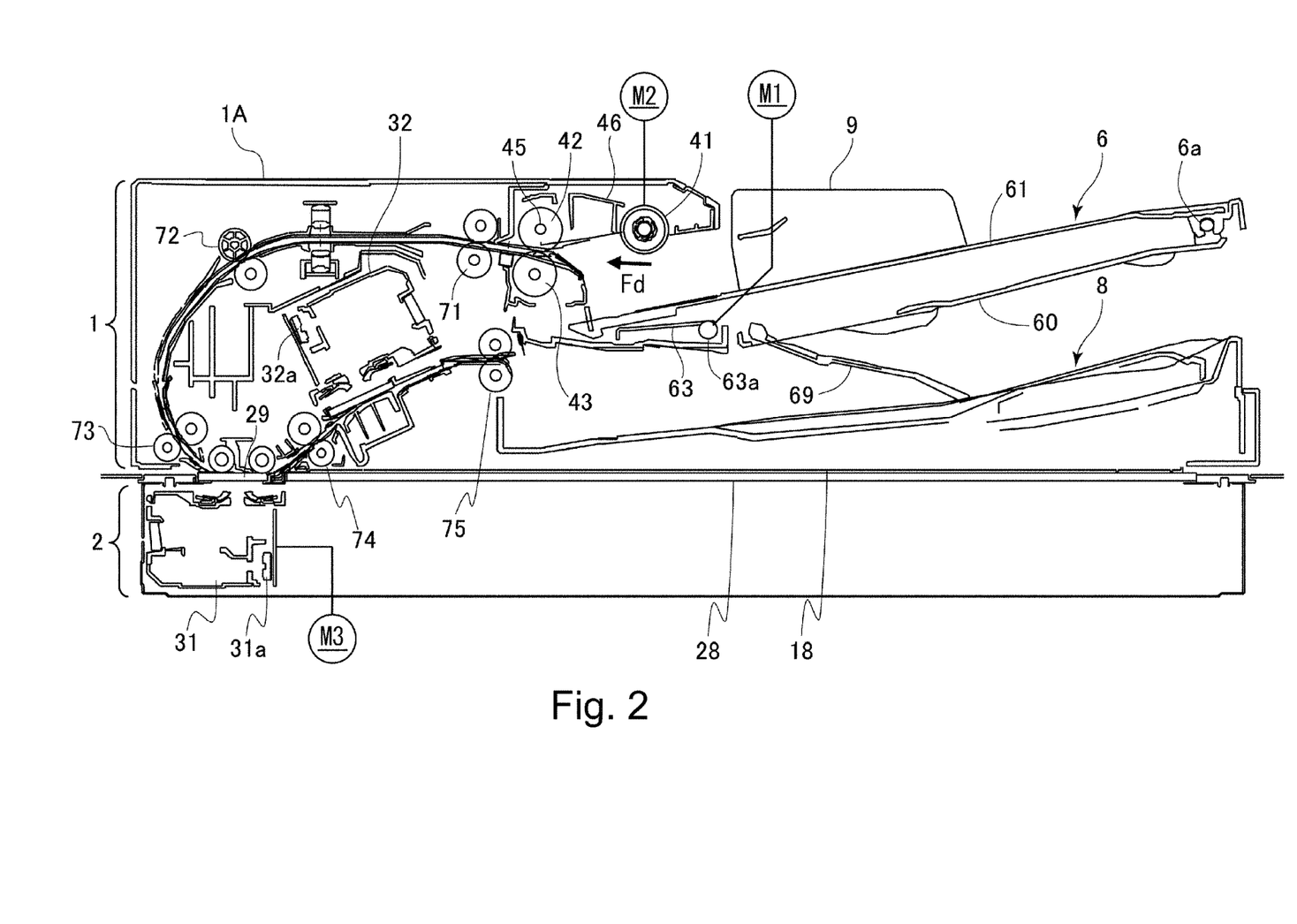
FIG. 2 is a sectional view of a scanner according to the embodiment 1.

FIG. 2 is a sectional view of the scanner 3 according to this embodiment. The scanner 3 includes a flat-bed portion 2 which is a reading unit of a flat-bed type and includes an ADF 1 as a sheet feeding apparatus for feeding the sheet which is the original. The ADF is an abbreviation of an automatic document feeder. In the image forming apparatus 100, the flat-bed portion 2 is fixed to an upper portion of the printer main assembly 10, and the ADF 1 is rotatably supported by the flat-bed portion 2 and is configured to be openable (and closable) relative to an upper surface of the flat-bed portion 2.

In this embodiment, the flat-bed portion 2 and the ADF 1 are provided with image sensors 31 and 32, respectively, as a reading means for reading the image information from the original. The image sensor 31 provided in the flat-bed portion 2 reads the image information from a reading surface of the original placed on an original supporting platen glass 28 and a first surface of the original fed by the ADF 1. The image sensor 32 provided in the ADF 1 reads the image information from a second surface fed by the ADF 1. Each of the image sensors 31 and 32 includes a light guide member for irradiating the original with light from a light source, an associated image pick-up device (element) 31a or 32a for subjecting an optical image of the original to photoelectric conversion, and an optical system for imaging reflected light from the original, on the image pick-up device 31a or 32a. In an illustrated example, the image sensors 31 and 32 of a so-called CCD type using a charge coupled device as the image pick-up device and using a reduction optical system as the optical system is used, but for example, for example, a contact image sensor (CIS) in which a CMOS sensor and a nonmagnification optical system are combined with each other may also be used.

The flat-bed portion 2 includes the original supporting platen glass 28 on which a still original is placed, a platen glass 29 and the image sensor 31. The original supporting platen glass 28 which is a transparent member is disposed so as to oppose a pressure plate 18 provided at a lower surface of the ADF 1 in a state in which the ADF 1 is closed. The image sensor 31 is mounted on a carriage driven by a carriage motor M3 and is movable in a sub-scan direction (left-right direction in FIG. 2) in a lower-side space of the original supporting platen glass 28 and the platen glass 29.

The ADF 1 includes an original tray 6 as a stacking member on which the originals are to be stacked, an ADF main body 1A for feeding and conveying the originals one by one from the original tray 6, and a discharge tray 8 on which the originals discharged from the ADF main body 1A are to be stacked.

The original tray 6 which is a rotatable member in this embodiment includes a tray main body 60 rotatably supported by a frame of the ADF main body 1A, a stacking table 61 supported by the tray main body 60 as a supporting member, and a lifter 63 for raising and lowering the stacking table 61. The tray main body 60 is rotatably supported by the ADF main body 1A constituting a part of a main assembly of the image reading apparatus and projects toward an upstream side with respect to an original feeding direction Fd (leftward direction in FIG. 2) relative to the ADF main body 1A. The stacking table 61 as a stacking portion on which the originals are to be stacked is vertically rotatable relative to the tray main body 60 about a lift-supporting point 6a provided at an upstream end with respect to the feeding direction Fd. The lifter 63 is disposed below the stacking table 61 and raises and lowers the stacking table 61 by being rotated integrally with a lifter driving shaft 63a driven by a driving force of a lift motor M1. Further, the original tray 6 is provided with a pair of side end restricting plates 9 for restricting an original position in contact with opposite ends of the original with respect to a widthwise direction (perpendicular to the feeding direction Fd) of the original.

The ADF main body 1A includes a feeding path forming a feeding (conveying) passage from the original tray 6 to the discharge tray 8 through reading positions of the image sensors 31 and 32 and includes a plurality of roller members for feeding the original from the original tray 6 and for conveying the original along the feeding (conveying) passage. As seen in the widthwise direction (main scan direction of the image sensors 31 and 32) of the original, the original tray 6 is in a positional relationship such that the original tray 6 is disposed just above the discharge tray 8 so as to overlap with the discharge tray 8, and the feeding path of the ADF main body 1A is folded back in a U-shape. That is, the feeding direction Fd (leftward direction) in which the original is fed from the original tray 6 and a discharging direction (rightward direction) in which the original is discharged from the ADF main body 1A are opposite in horizontal direction component to each other.

In the plurality of roller members provided in the ADF main body 1A, a pick-up roller 41, a feeding roller 42, a separation roller 43, conveying rollers 71, 72, 73 and 74, and a discharging roller 75 are included. The pick-up roller 41 as a feeding means in this embodiment is disposed above the stacking table 61 of the original tray 6 and is supported by an arm member 46 swingable about a driving shaft 45 supporting the feeding roller 42. By controlling an attitude of the arm member 46 by a cam mechanism or the like with power of an unshown motor, raising and lowering of the pick-up roller 41 relative to the stacking table 61 is controlled. Further, the pick-up roller 41 is driven and rotated by a feeding motor M2 in a state in which the pick-up roller 41 contacts an upper surface of an uppermost original of originals stacked on the stacking table 61, so that the pick-up roller 41 feeds the uppermost original in the feeding direction Fd.

The feeding roller 42 rotates about the driving shaft 45 and further feeds the original received from the pick-up roller 41. The separation roller 43 forms a separation nip in contact with the feeding roller 42 and disconnected through a torque limiter to a shaft member fixed to the frame of the ADF main body 1A. The separation roller 43 is an example of a separating member for feeding a sheet (original) as an object to be fed in a state in which sheets are separated one by one and a retard roller to which a driving force in a direction opposite to the feeding direction Fd is inputted or a pad-like frictional member contacting the feeding roller 42 may also be used as the separating member.

The conveying rollers 71 to 74 are conveying means in this embodiment for conveying the original (sheet) passed through the separation nip along a curved feeding (conveying) path. The discharging roller 75 is a discharging means in this embodiment for discharging the original, subjected to reading of image information, to an outside of the ADF main body 1A.

In the following, a flow of an operation (moving operation) for reading the image information while feeding the original by the ADF 1 will be described.

FIG. 2 shows a state in which the ADF 1 wait for stacking of the original(s) by a user. In this state, the original tray 6 is in a predetermined lower position and a lift-up of the stacking table 61 has not been carried out. When the stacking of the original on the stacking table 61 is detected by a sensor provided to the original tray 6, a controller provided to the scanner 3 starts drive of the lift motor M1, so that the stacking table 61 is lifted up. When the sensor detects that the uppermost original on the stacking table 61 reaches a predetermined height, the controller stops the drive of the lift motor M1. Then, when the controller receives a start instruction of the reading operation from the user, the controller starts rotational drive of the pick-up roller 41 in a state in which the pick-up roller 41 contacts the uppermost original. By this, the original is fed in the feeding direction Fd from the original tray 6 toward the separation nip.

The original fed by the pick-up roller 41 is further fed toward the conveying roller 71 by the feeding roller 42. At this time, when a plurality of originals (sheets) enter the separation nip, on the original(s) other than the uppermost original contacting the feeding roller 42, the separation roller 43 causes a frictional force to act in a direction opposite to the feeding direction Fd, so that double (multiple) feeding of the originals is prevented.

The feeding rollers 71 to 74 conveys the original while delivering the original along the curved conveying path. During a process of conveyance, the original passes through a first reading position where the original is scanned by the image sensor 31 of the flat-bed portion 2 through the platen glass 29 and a second reading position where the original is scanned by the image sensor 32 of the ADF main body 1A. Thus, a first side (surface) and a second side (surface) of the original are optically scanned by the image sensors 31 and 32, so that pieces of image information converted into electronic signals by image pick-up devices (elements) 31a and 32a are acquired. The original passed through the reading positions of the image sensors 31 and 32 is discharged onto the discharge tray 8 by the discharging roller 75. At this time, by a swingable original pressing guides 69 hangs down from the original tray 6, the position of the original with respect to the discharging direction is restricted, and the originals discharged one by one are stacked on the discharge tray 8. Thereafter, by removing the originals from the discharge tray 8 by the user, so that a series of operations is completed.

Supporting Structure of Original Tray

Here, a supporting structure of the original tray 6 which is the predetermined member in this embodiment will be described using parts (a) to (c) of FIG. 3. As described above, the original subjected to the image information reading by the moving reading operation is discharged onto the discharge tray 8 positioned below the original tray 6. At this time, depending on a build of the user or an amount of the original(s) on the discharge tray 8, from the viewpoints of ensuring of a space for access to the original and improvement in viewability, it is preferable that the original tray 6 is raised in some cases.

Figure 3:
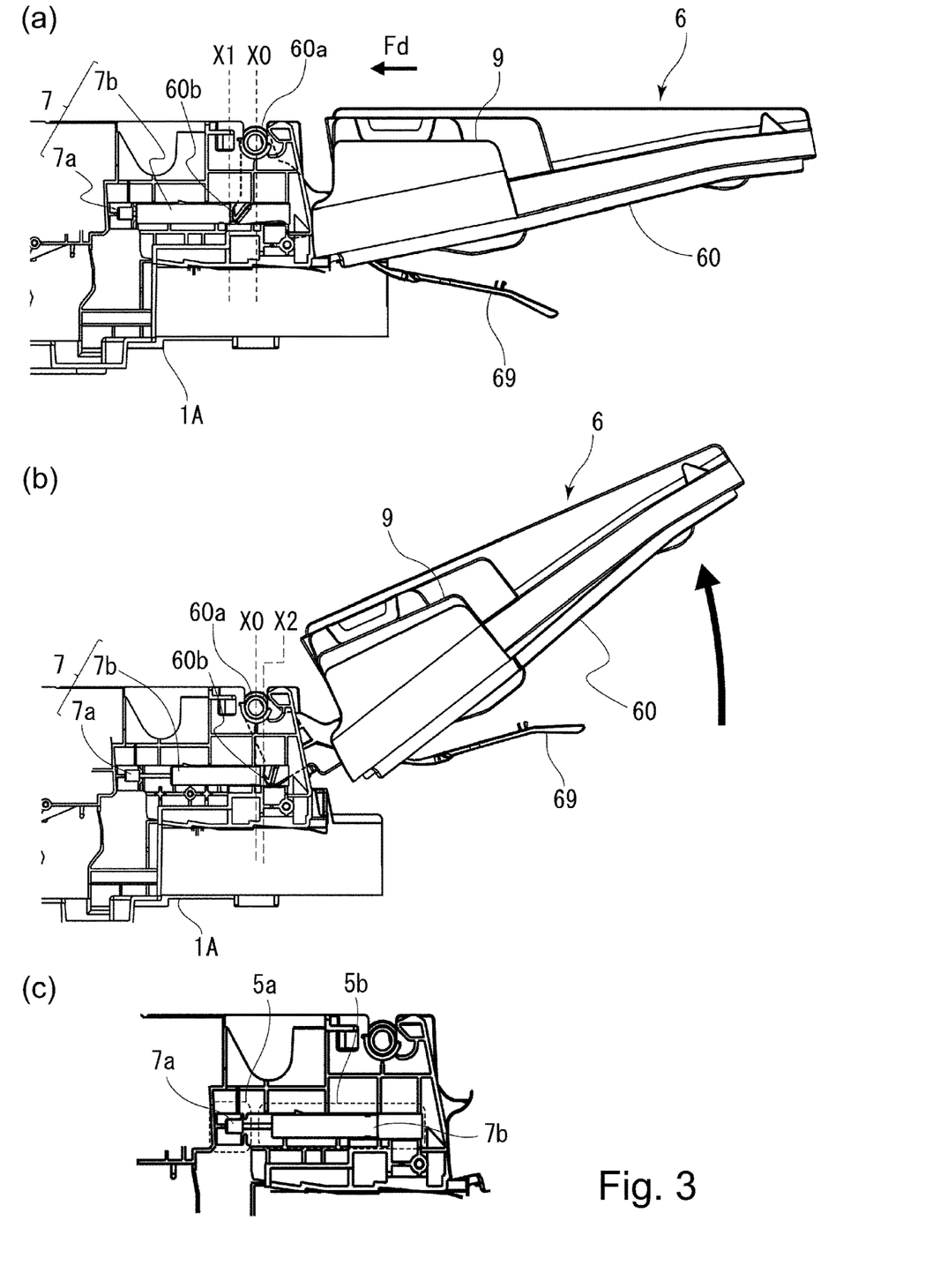

For that reason, as shown in part (a) of FIG. 3, the original tray 6 is supported by the ADF main body 1A in a rotatable state about a shaft-supporting portion 60a. In the following, a position of the original tray 6 when the original is stacked on the original tray 6 is referred to as an initial position (home position). That is, the original tray 6 is capable of being rotated from the initial position which is a lower position in this embodiment to a position (upper position in this embodiment) in a raised state as shown in part (b) of FIG. 3.

As shown in part (a) of FIG. 3, the ADF main assembly 1A is provided with a cylinder damper 7 as a damper unit for damping falling of the original tray 6. The CD 7 includes an outer tube 7b incorporating a spring and a piston rod 7a inserted into the outer tube 7b. The piston rod 7a as a piston portion is constituted by a piston value inserted into the outer tube 7b as a cylinder portion and by a resin cap projecting toward an outside of the outer tube 7b.

The cylinder damper 7 expands and contracts in an axial direction of the outer tube 7b as an expansion and contraction direction by a slide (movement) of the piston rod 7a and the outer tube 7b. At this time, by viscosity resistance of a fluid (oil, air or the like) filled in the outer tube 7b, a force resisting relative movement between the piston rod 7a and the outer tube 7b generates. Further, the spring incorporated in the outer tube 7b generates an urging force, for restoring a state of the cylinder damper 7 to an expansion (elongation) state, between the piston rod 7a and the outer tube 7b.

The tray main body 60 of the original tray 60 is provided with an abutting portion 60b as a contact portion for generating a damper action by pressing the cylinder damper 7. The abutting portion 60b is provided at a position spaced from the shaft supporting portion 60a (i.e., a rotational axis of the original tray 6) as seen in an axial direction of the shaft supporting portion 60a of the original tray 6, and moves with rotation of the original tray 6 so as to draw an arcuate locus around the shaft supporting portion 60a.

The cylinder damper 7 is disposed at a position to which the abutting portion 60b is contacted with the rotation of the original tray 6, in an attitude perpendicularly crossing the axial direction of the shaft supporting portion 60a of the original tray 6. Particularly, in an illustrated example, the cylinder damper 7 is disposed in an attitude in which the original feeding direction Fd substantially coincides with a contraction direction as seen in the vertical direction.

In this embodiment, the piston rod 7a is fixed to the ADF main body 1A, and the outer tube 7b is supported by the ADF main body 1A in a slidable state in the expansion and contraction direction. That is, as shown in part (c) of FIG. 3, the ADF main body 1A includes a holding portion 5a for holding the piston rod 7a in a movement-restricted state in the expansion and contraction direction and a guiding portion 5b for slidably guiding the outer tube 7b relative to the piston rod 7a. The holding portion 5a engages with the resin cap of the piston rod 7a, so that movement of the piston rod 7a to one side or the other side with respect to the contraction direction is restricted. The guiding portion 5b is constituted by a member opposing a cylindrical outer peripheral surface of the outer tube 7b and forms a space extending in the contraction direction so as to accommodate the outer tube 7b.

By such a constitution, in the case where the cylinder damper 7 is pressed by the abutting portion 60b drawing the arcuate locus about the shaft supporting portion 60a as a rotation center, it is possible to reduce that a component force in a direction crossing the contraction direction acts on the cylinder damper 7. That is, in a modified example in which the outer tube 7a is fixed to the ADF main body 1A and the piston rod 7a is moved by being pressed by the abutting portion 60b, there is a possibility that the piston rod 7a is inclined in a direction crossing the contraction direction and thus a load is exerted on the cylinder damper 7. According to the constitution of this embodiment, an occurrence of such a load is suppressed, and therefore, it becomes possible to use a small-sized cylinder damper 7 with a relatively low strength. However, this does not exclude that the present invention is carried out in the constitution of the modified example.

In the following, of the expansion and contraction direction of the cylinder damper 7, a direction in which the outer tube 7b moves so that a degree of engagement thereof with the piston rod 7a decreases is referred to as an "expansion (elongation) direction", and a direction opposite to the expansion direction is referred to as the "contraction direction". That is, the abutting portion 60b of the original tray 6 is configured to contact an end portion of the outer tube 7b with respect to the expansion direction (this end portion is referred to as a portion-to-be-pressed) and thus to press the outer tube 7b in the contraction direction to contract the cylinder damper 7.

Positions X1 and X2 in parts (a) and (b) of FIG. 3 represent end positions of a stroke of the cylinder damper 7. That is, with respect to the expansion and contraction direction of the cylinder damper 7, the contraction position X1 represents the position of the outer tube 7b in a state of part (a) of FIG. 3 in which the cylinder damper 7 is most contracted. The contraction position X1 represents the position of the outer tube 7b in the case where the original tray 6 is in the initial position. Further, with respect to the expansion and contraction direction of the cylinder damper 7, the expansion position X2 represents the position of the outer tube 7b in a state of part (b) of FIG. 3 in which the cylinder damper 7 is most expanded. However, each of the contraction position X1 and the expansion position X2 represents the position of the outer tube 7b on the basis of the portion-to-be-pressed.

The abutting portion 60b of the original tray 6 presses the outer tube 7b in a range from the expansion position X2 to the contraction position X1. Here, a reference position X0 just below the shaft supporting portion 60a with respect to the expansion and contraction direction is included in the range from the expansion position X2 to the contraction position X1 (parts (a) and (b) of FIG. 3). The abutting portion 60b draws the arcuate locus about the shaft supporting portion 60a, so that a movement direction of the abutting portion 60b at the moment when the abutting portion 60b passes through this reference position X0 coincides with the expansion and contraction direction. Such an arrangement also contributes to reduce that the component of force in the direction crossing the expansion and contraction direction acts on the cylinder damper 7.

Further, the guiding portion 5b provided in the ADF main body 1A is configured to guide the outer tube 7b over an entire region of the stroke of the cylinder damper 7. In other words, the guiding portion 5b is formed so that a state in which the guiding portion 5b opposes the outer peripheral surface of the outer tube 7b is maintained during movement of the outer tube 7b from one end portion position (X2) to the other end portion position (X1) in a movable range of the outer tube 7b.

In the following, action of the cylinder damper 7 with rotation of the original tray 6 will be described.

In the case where the user grips the original tray 6 being in the initial position shown in part (a) of FIG. 3 and then raises the original tray 6 to the position shown in part (b) of FIG. 3, the abutting portion 60b of the original tray 6 moves in the expansion direction of the cylinder damper 7. At this time, a resisting force of the cylinder damper 7 does not act on the original tray 6, so that the outer tube 7b moves from the contraction position X1 toward the expansion position X2 by the action of the spring.

The original tray 6 can be further rotated upward to a position higher than an angle (a predetermined position which is a limit of a contactable range between the abutting portion 60b and the cylinder damper 7) shown in part (b) of FIG. 3. In that case, the abutting portion 60b of the original tray 6 further moves in the expansion direction to a position remoter from the outer tube 7b than the expansion position X2 is, so that the abutting portion 60b is separated from the outer tube 7b.

Thereafter, when the user releases his (her) hand(s) from the original tray 6, the original tray 6 starts to lower (fall) toward the initial position by a self-weight thereof. During the lowering (falling), when the original tray 6 lowers to the predetermined position, the abutting portion 60b of the original tray 6 contacts the outer tube 7b being in the expansion position X2. When the original tray 6 further lowers from that state, the abutting portion 60b presses the outer tube 7b in the contraction direction, and therefore, the cylinder damper 7 is contracted.

A resisting force generating when the cylinder damper 7 is contracted acts as a force for pushing back the cylinder damper 7 in the expansion direction by the outer tube 7b. In other words, a reaction force received from the outer tube 7b when the abutting portion 60b pushes the cylinder damper 7 generates a torque for pushing back the original tray 6 upward about the shaft supporting portion 60a. Thus, the original tray 6 lowers while receiving the resisting force generated by the cylinder damper 7, so that the lowering speed of the original tray 6 is suppressed.

Thus, in this embodiment, a constitution in which the cylinder damper 7 is disposed in the ADF main body 1A and the abutting portion 60b is provided to the original tray 6 and in which the abutting portion 60b pushes the cylinder damper 7 inward when the original tray 6 lowers is employed. By this, a mechanism for suppressing the lowering speed of the original tray which is the rotatable member can be realized by a simple constitution without using the rotary damper. That is, there is no need to employ a mechanism such as a gear train required for generating a damping force with a sufficient magnitude for the rotary damper.

Further, in this embodiment, a constitution in which of the outer tube 7b and the piston rod 7a which constitute the cylinder damper 7, the outer tube 7b is slid by being pressed by the abutting portion 60b is employed. Compared with a constitution in which the piston rod 7a is slid by the abutting portion 60b, this constitution is capable of easily ensuring a distance in which the guiding portion is capable of guiding a member-to-be-slid while opposing the outer peripheral surface of the member-to-be-slid. That is, in the case where the piston rod 7a is slid, in order to restrict that the piston rod 7a is inclined by receiving a force in the direction crossing the expansion and contraction direction, there is a need to form a cylindrical guiding constitution, for guiding the resin cap, long in the expansion and contraction direction. On the other hand, the outer tube 7b itself has a cylindrical shape extending in the expansion and contraction direction, so that it is possible to realize a stable operation of the cylinder damper 7 by a compact guiding constitution (the guiding portion 5b in this embodiment).

Modified Embodiment 1

In the above-described embodiment, the stacking table 61 of the original tray 6 is configured to be capable of being raised and lowered relative to the tray main body 60, but an original mounting surface may also be formed integrally with the tray main body 60. In that case, by raising and lowering the pick-up roller 41, the pick-up roller 41 moves toward and away from the original stacked on the state 6.

In the above-described embodiment, the cylinder damper 7 is mounted in the ADF main body 1A, but the cylinder damper 7 may also be mounted in the original tray 6. In that case, an abutting portion is provided to the ADF main body 1A and contacts the cylinder damper 7 when the original tray 6 lowers, so that the cylinder damper 7 is actuated.

Embodiment 2

In the above-described embodiment 1, the mechanism for damping the falling of the original tray of the scanner was described, but in an embodiment 2, a mechanism for damping falling of a pressure plate unit is provided to an image reading apparatus of a flat-bed type.

Figure 4:
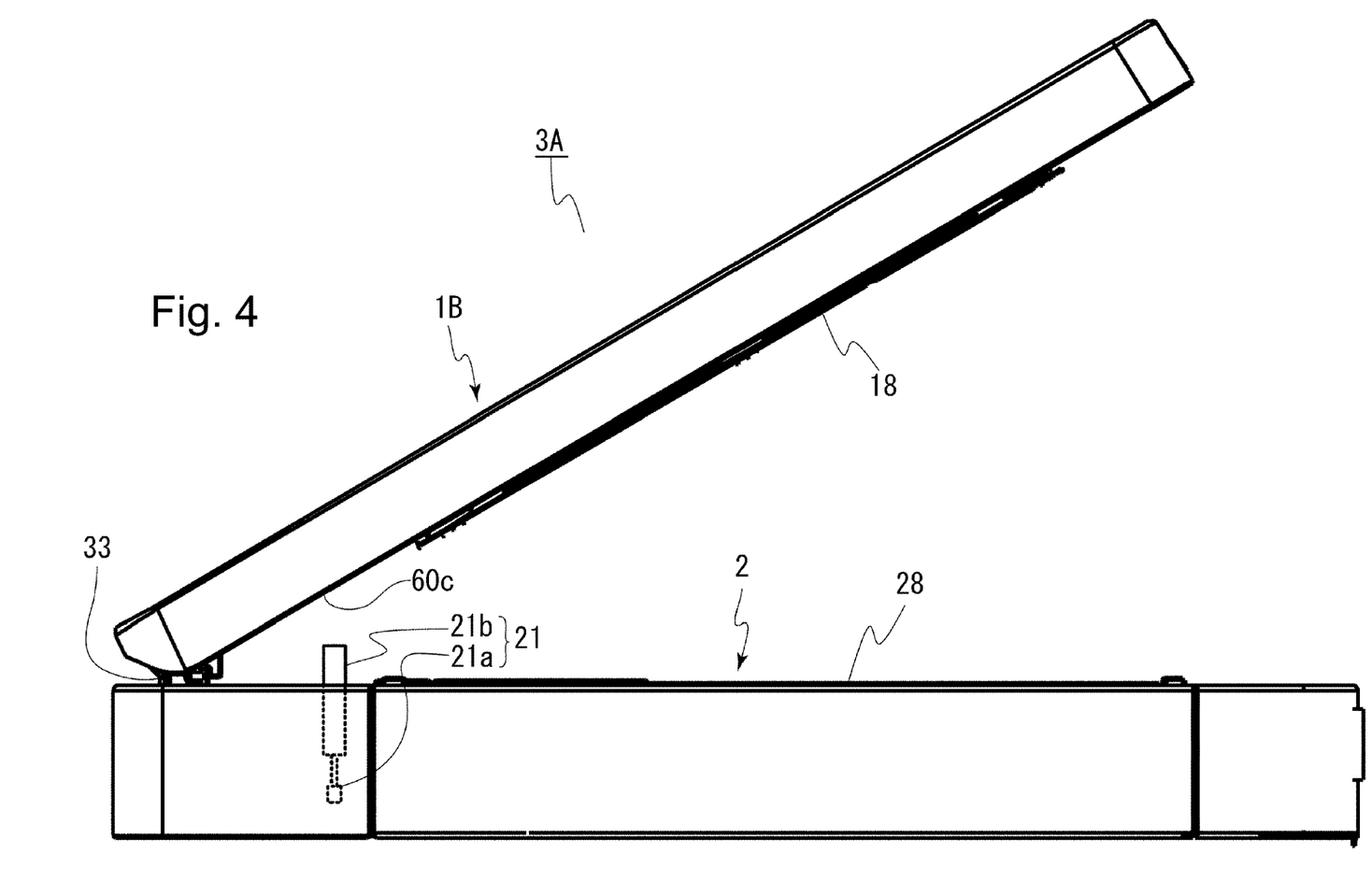
FIG. 4 is a schematic view of a scanner according to an embodiment 2.

FIG. 4 is a side view showing a scanner 3A as the image reading apparatus according to this embodiment. The scanner 3A includes a flat-bed portion 2 and a pressure plate unit 1B supported so as to be openable (and closable) relative to the flat-bed portion 2 through a hinge 33. The flat-bed portion 2 is an apparatus main assembly in this embodiment, and the pressure plate unit 1B is a rotatable member in this embodiment.

The flat-bed portion 2 includes, similarly as in the embodiment 1, an image sensor movable in the sub-scan direction and the original supporting platen glass 28 which is a transparent member on which the original is to be placed. At a lower surface of the pressure plate unit 1B, a white pressure plate 18 is mounted and presses the original against the original supporting platen glass 28 in a state in which the pressure plate unit 1B is closed. In this state, the image sensor optically scans the original while moving below the original supporting platen glass 28, and an image pick-up device of the image sensor converts reflected light from the original into an electronic signal, so that image data of the original is read.

In this embodiment, a cylinder damper 21 as a damper unit is mounted in the flat-bed portion 2. The cylinder damper 21 includes an outer tube 21b incorporating a spring and a piston rod 21a inserted into the outer tube 21b. The pressure plate unit 1B is provided with an abutting portion 60c as a contact portion for generating a damper action by pressing the cylinder damper 21. The abutting portion 60c is provided at a position spaced from a rotational axis of the hinge 33 as seen in an axial direction of the hinge 33, and moves with opening and closing of the pressure plate unit 1B so as to draw an arcuate locus around the hinge 33.

The cylinder damper 21 is disposed at a position to which the abutting portion 60c is contacted with the rotation of the pressure plate unit 1B, in an attitude perpendicularly crossing the rotational axis of the hinge 33. Particularly, in an illustrated example, the cylinder damper 21 is disposed in an attitude in which the expansion and contraction direction substantially coincides with a vertical direction.

The piston rod 21a is fixed to a frame of the flat-bed portion 2, and the outer tube 21b is supported by the frame of the flat-bed portion 2 in a slidable state in the expansion and contraction direction. That is, the flat-bed portion 2 includes a holding portion for holding the piston rod 21a in a movement-restricted state in the expansion and contraction and a guiding portion for slidably guiding the outer tube 21b relative to the piston rod 21a.

As shown in FIG. 4, in a state in which the pressure plate unit 1B is opened, by an urging force of the spring, an upper end of the outer tube 21b which is a contact surface with the abutting portion 60c projects upward from the flat-bed portion 2. When the pressure plate unit 1B is rotated downward, at a predetermined angle (a predetermined position), the abutting portion 60c contacts the upper end of the outer tube 21b of the cylinder damper 21 and starts to press the outer tube 21b downward. Then, by a resisting force generating with contraction of the cylinder damper 21, a lowering speed of the pressure plate unit 1B is suppressed. A damping action of the cylinder damper 21 continues until the pressure plate unit 1B reaches a lower limit position (a position for permitting reading of the image) of a rotatable range of the pressure plate unit 1B.

Thus, also by the constitution of this embodiment, a mechanism for suppressing the lower speed of the pressure plate unit 1B which is the rotatable member can be realized by a simple constitution.

Incidentally, the pressure plate unit 1B is urged upward by a spring member provided to the hinge 33, so that a load alleviation of an opening operation and retention of the open state are realized in some instances. In this case, the pressure plate unit 1B lowers while receiving an urging force of the spring member without causing free fall thereof, but there is a possibility that the pressure plate unit 1B vigorously collides with the flat-bed portion 2 depending on a degree of adjustment of a force of a closing operation by the user. For that reason, by damping the lowering of the pressure plate unit 1B by using the cylinder damper 21, an effect of reducing a degree of occurrences of breakage and noise due to collision between the members is obtained similarly as in the embodiment 1.

Modified Embodiment 2

In the embodiment shown in FIG. 4, the cylinder damper 21 is mounted in the flat-bed portion 2, but may also be mounted in the pressure plate unit 1B. In that case, not only the cylinder damper 21 is mounted so that the outer tube 21b projects downward from the pressure plate unit 1B, but also the abutting portion contacting a lower end of the outer tube 21b with a closing operation of the pressure plate unit 1B is provided at an upper portion of the flat-bed portion 2.

Embodiment 3

Figure 5:
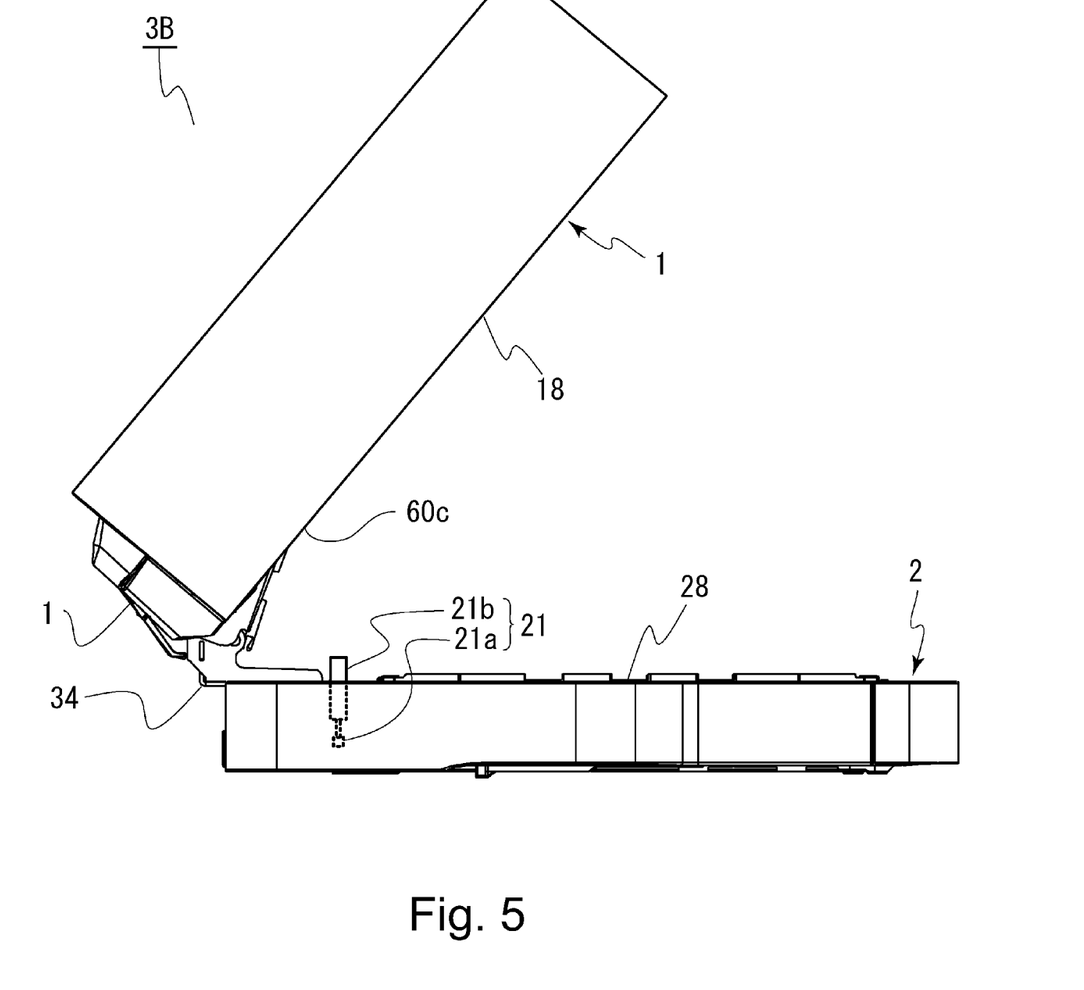
FIG. 5 is a schematic view of a scanner according to an embodiment 3.

As an embodiment 2, a constitution in which a mechanism for damping falling of and ADF 1 is provided to will be described. FIG. 5 is a side view showing a scanner 3B as an image reading apparatus according to this embodiment. The scanner 3B includes a flat-bed portion 2 and the ADF 1 supported so as to be openable (and closable) relative to the flat-bed portion 2 through a hinge 34. The flat-bed portion 2 is an apparatus main assembly in this embodiment, and the ADF 1 is a rotatable member in this embodiment. The flat-bed portion 12 and an inside structure of the ADF 1 are similar to those described in the embodiment 1.

Similarly as in the embodiment 2, a cylinder damper 21 as a damper unit is mounted in the flat-bed portion 2. The cylinder damper 21 includes an outer tube 21b incorporating a spring and a piston rod 21a inserted into the outer tube 21b. The ADF 1 is provided with an abutting portion 60c as a contact portion for generating a damper action by pressing the cylinder damper 21. The abutting portion 60c is provided at a position spaced from a rotational axis of the hinge 33 as seen in an axial direction of the hinge 33, and moves with opening and closing of the ADF 1 so as to draw an arcuate locus around the hinge 33.

The cylinder damper 21 is disposed at a position to which the abutting portion 60c is contacted with the rotation of the ADF 1, in an attitude perpendicularly crossing the rotational axis of the hinge 33. Particularly, in an illustrated example, the cylinder damper 21 is disposed in an attitude in which the expansion and contraction direction substantially coincides with a vertical direction.

The piston rod 21a is fixed to a frame of the flat-bed portion 2, and the outer tube 21b is supported by the frame of the flat-bed portion 2 in a slidable state in the expansion and contraction. That is, the flat-bed portion 2 includes a holding portion for holding the piston rod 21a in a movement-restricted state in the expansion and contraction and a guiding portion for slidably guiding the outer tube 21b relative to the piston rod 21a.

As shown in FIG. 5, in a state in which the ADF 1 is opened, by an urging force of the spring, an upper end of the outer tube 21b which is a contact surface with the abutting portion 60c projects upward from the flat-bed portion 2. When the ADF 1 is rotated downward, at a predetermined angle (a predetermined position), the abutting portion 60c contacts the upper end of the outer tube 21b of the cylinder damper 21 and starts to press the outer tube 21b downward. Then, by a resisting force generating with contraction of the cylinder damper 21, a lowering speed of the ADF 1 is suppressed. A damping action of the cylinder damper 21 continues until the ADF 1 reaches a lower limit position of a rotatable range of the pressure plate unit 1B.

Thus, also by the constitution of this embodiment, a mechanism for suppressing the lower speed of the ADF 1 which is the rotatable member can be realized by a simple constitution. Incidentally, as described in the modified embodiment 2 of the embodiment 2, the cylinder damper 21 is mounted in the ADF 1 which is rotatable member, and the abutting portion provided to the flat-bed portion 2 is contacted to the cylinder damper 21, so that the cylinder damper 21 may also be actuated.

Other Embodiments

In the above-described embodiments 1 to 3, the constitution in which the lowering of the rotatable member provided to the scanner which is the example of the image reading apparatus is damped by the damper unit of the cylinder type was described, but an object to which the present invention is applied is not limited thereto. It is possible to damp lowering of a rotatable member (for example, the manual feeding tray 40a provided on the side surface of the printer main assembly 10 so as to be openable (and closable) in FIG. 1) provided in the image forming apparatus. In the case of the manual feeding tray 40a, the cylinder damper 21 is mounted in the frame of the printer main assembly 10 and an abutting portion contracted in contact with the cylinder damper 21 with an opening operation of the manual feeding tray 40a may only be required to be provided as a part of the manual feeding tray 40a.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-141901 filed on Aug. 1, 2019, which is hereby incorporated by reference herein in its entirety.

What is claimed is:

1. An image reading apparatus comprising:
a stacker on which a sheet is stacked;
a feeder configured to feed the sheet stacked on said stacker;
a reader configured to read an image on the sheet fed by said feeder;
a main assembly configured to support said stacker so that said stacker is rotatable between a lower position and an upper position above the lower position;
a damper unit mounted in said main assembly and including a cylinder portion and a piston portion inserted into said cylinder portion, wherein said damper unit is configured to be expanded in an expansion direction and to be contracted in a contraction direction by sliding said cylinder portion and said piston portion relative to each other; and
a contact portion provided on said stacker and configured to contact said damper unit,
wherein the damper unit suppresses a speed of said stacker when said stacker lowers from the upper position toward the lower position in a state in which the contact portion contacts and presses the damper unit in the contraction direction, and
wherein the expansion and contraction directions are parallel to the feeding direction as viewed in a vertical direction.

2. An image reading apparatus according to claim 1, wherein said main assembly includes a holding portion configured to hold said piston portion in a state movement of said piston portion in the expansion and contraction direction is restricted and includes a guiding portion configured to guide said cylinder portion so as to be slidable in the expansion and contraction direction, and
wherein said contact portion contacts said cylinder portion.

3. An image reading apparatus according to claim 2, wherein said guiding portion is formed so as to be maintained in a state, in which said guiding portion opposes an outer peripheral surface of said cylinder portion, until said cylinder portion moves from one end portion position to the other end portion position in a movable range in the expansion and contraction direction.

4. An image reading apparatus according to claim 1, wherein within a rotatable range of said stacker in a state in which said contact portion contacts said damper unit, a position where a movement direction of said contact portion with rotation of said stacker coincides with the expansion and contraction direction is included.

5. An image reading apparatus according to claim 1 wherein said contact portion is provided at a position remote from a rotation shaft of said stacker, and
wherein said damper unit is disposed in an attitude in which the expansion and contraction direction crosses perpendicular to a direction of the rotation shaft of said stacker.

6. An image reading apparatus according to claim 1, wherein said contact portion is constituted so that said contact portion is separated from said damper unit when said stacker is in the upper position and so that said contact portion presses said damper unit in a range from a predetermined position between the lower position and the upper position to the lower position when the stacker lowers from the upper position toward the lower position.

7. An image reading apparatus according to claim 1, wherein said damper unit is disposed below a rotation shaft of said stacking member, and
wherein said contact portion presses said damper unit toward a downstream side of the feeding direction when said stacker lowers toward the lower position.

8. An image reading apparatus according to claim 1, wherein by viscosity resistance of a fluid filled in said cylinder portion, a force resisting relative movement between said piston portion and said cylinder portion.

9. A sheet feeding apparatus comprising:
a stacker on which a sheet is stacked;
a feeder configured to feed the sheet stacked on said stacker;
a main assembly configured to support said stacker so that said stacker is rotatable between a lower position and an upper position above the lower position;
a damper unit mounted in said main assembly and including a cylinder portion and a piston portion inserted into said cylinder portion, wherein said damper unit is configured to be expanded in an expansion direction and to be contracted in a contraction direction by sliding said cylinder portion and said piston portion relative to each other; and
a contact portion provided on said stacker and configured to contact said damper unit,
wherein the damper unit suppresses a speed of said stacker when said stacker lowers from the upper position toward the lower position in a state in which the contact portion contacts and presses the damper unit in the contraction direction, and
wherein the expansion and contraction directions are parallel to the feeding direction as viewed in a vertical direction.

10. An image forming apparatus comprising:
a stacker on which a sheet is stacked;
a feeder configured to feed the sheet stacked on said stacker;
an image former configured to form an image on the sheet fed by said feeder;
a main assembly configured to support said stacker so to be that said stacker is rotatable between a lower position and an upper position above the lower position;
a damper unit mounted in said main assembly and including a cylinder portion and a piston portion inserted into said cylinder portion, wherein said damper unit is configured to be expanded in an expansion direction and to be contracted in a contraction direction by sliding said cylinder portion and said piston portion relative to each other; and
a contact portion provided on said stacker and configured to contact said damper unit, wherein the damper unit suppresses a speed of said stacker when said stacker lowers from the upper position toward the lower position in a state in which the contact portion contacts and presses the damper unit in the contraction direction, and wherein the expansion and contraction directions are parallel to the feeding direction as viewed in a vertical direction.

\* \* \* \* \*